US009154372B2

(12) United States Patent
Richmond et al.

(10) Patent No.: US 9,154,372 B2
(45) Date of Patent: Oct. 6, 2015

(54) EDITING A PORTABLE, DYNAMIC AND ABSTRACT VIEW DEFINITION OF A NETWORK OBJECT DATABASE

(75) Inventors: James P. Richmond, Newfields, NH (US); Steven Charles Bir, Lee, NH (US); David Scott Grieve, Durham, NH (US); Brian Stanley Locke, Lee, NH (US); Christopher McClain, Dover, NH (US); Daniel Timothy Murphy, Lee, NH (US)

(73) Assignee: EXTREME NETWORKS, INC., San Jose, CA (US)

( * ) Notice: Subject to any disclaimer, the term of this patent is extended or adjusted under 35 U.S.C. 154(b) by 1276 days.

(21) Appl. No.: 10/627,328

(22) Filed: Jul. 25, 2003

(65) Prior Publication Data

US 2004/0153966 A1  Aug. 5, 2004

Related U.S. Application Data

(60) Provisional application No. 60/428,586, filed on Nov. 22, 2002.

(51) Int. Cl.
*H04L 12/24* (2006.01)
*G06F 17/24* (2006.01)

(52) U.S. Cl.
CPC .......... *H04L 41/0213* (2013.01); *G06F 17/245* (2013.01); *H04L 41/22* (2013.01)

(58) Field of Classification Search
CPC . G06F 15/173; G06F 17/30; G06F 17/30312; G06F 17/245; H04L 12/2405; H04L 12/2403; H04L 41/0213; H04L 41/22

USPC ................. 715/736, 509, 764, 866; 709/223; 707/102, 103 X
See application file for complete search history.

(56) References Cited

U.S. PATENT DOCUMENTS

| | | | |
|---|---|---|---|
| 5,774,667 A | | 6/1998 | Garvey et al. |
| 5,821,937 A | * | 10/1998 | Tonelli et al. ................. 715/853 |
| 6,020,889 A | * | 2/2000 | Tarbox et al. ................. 715/736 |
| 6,041,349 A | | 3/2000 | Sugauchi et al. |

(Continued)

OTHER PUBLICATIONS

AdventNet SNMP API 3.3. AdventNet Inc. 1999-2001. [URL] http://adventnet.com/products/snmp/index.html [retrieved from] Internet Archive http://web.archive.org/web/20011214075149/ [retrieved on] Apr. 12, 2013.*

(Continued)

*Primary Examiner* — Amy M Levy
(74) *Attorney, Agent, or Firm* — McCarter & English, LLP; David R. Burns

(57) ABSTRACT

A user is enabled to edit a table defining a view of a network object database, for example, a MIB. The user can select from among a plurality of network object types and select from among a plurality of columns of the table. At least one column of the table is specified by the user and edited to represent a network object type specified by the user. The view definition can be extracted from the application and transported to another device where it can be edited and/or viewed using a suitable application. Such portable view definition may be defined as part of a document, for example, a document formatted in accordance with a markup language, such as XML. Such document may include information for requesting objects to populate the view, which may be used to construct requests (e.g., SNMP requests) to retrieve objects from one or more network devices.

41 Claims, 11 Drawing Sheets

(56) References Cited

U.S. PATENT DOCUMENTS

| | | | |
|---|---|---|---|
| 6,456,306 B1 | 9/2002 | Chin et al. | |
| 6,732,170 B2* | 5/2004 | Miyake et al. | 709/223 |
| 6,754,703 B1* | 6/2004 | Spring | 709/223 |
| 6,829,615 B2* | 12/2004 | Goodwin et al. | 707/102 |
| 7,085,830 B1 | 8/2006 | Singhai et al. | |
| 7,111,053 B1 | 9/2006 | Black et al. | |
| 8,180,872 B1* | 5/2012 | Marinelli et al. | 709/223 |
| 2001/0042118 A1* | 11/2001 | Miyake et al. | 709/223 |
| 2002/0032761 A1 | 3/2002 | Aoyagi et al. | |
| 2002/0059565 A1* | 5/2002 | Reyna et al. | 717/146 |
| 2002/0161740 A1 | 10/2002 | Nakamura | |
| 2002/0161876 A1* | 10/2002 | Raymond | 709/223 |
| 2002/0174107 A1* | 11/2002 | Poulin | 707/3 |
| 2002/0186259 A1* | 12/2002 | Meandzija et al. | 345/853 |
| 2003/0001897 A1* | 1/2003 | Meandzija et al. | 345/772 |
| 2003/0012190 A1* | 1/2003 | Kaku et al. | 370/389 |
| 2003/0018772 A1* | 1/2003 | Meandzija et al. | 709/223 |
| 2003/0028624 A1* | 2/2003 | Hasan et al. | 709/220 |
| 2003/0028895 A1 | 2/2003 | Buchler et al. | |
| 2003/0033589 A1* | 2/2003 | Reyna et al. | 717/109 |
| 2003/0074430 A1* | 4/2003 | Gieseke et al. | 709/221 |
| 2003/0101251 A1* | 5/2003 | Low | 709/223 |
| 2003/0110262 A1* | 6/2003 | Hasan et al. | 709/226 |
| 2003/0115575 A1* | 6/2003 | Reyna | 717/120 |
| 2003/0131014 A1* | 7/2003 | Brinkmoeller et al. | 707/100 |
| 2003/0137532 A1 | 7/2003 | Proulx et al. | |
| 2003/0149756 A1* | 8/2003 | Grieve et al. | 709/223 |
| 2003/0154279 A1* | 8/2003 | Aziz | 709/225 |
| 2003/0154380 A1* | 8/2003 | Richmond et al. | 713/182 |
| 2003/0208480 A1* | 11/2003 | Faulkner et al. | 707/3 |
| 2004/0088432 A1* | 5/2004 | Hubbard et al. | 709/246 |

OTHER PUBLICATIONS

Coronel. Database Systems: Design Implementation and Management (2002) Thompson Learning. Various pages.*

Arciniegas. "XML structure, syntax and uses." In *XML Developer's Guide*, McGraw-Hill Osborne Media, p. 4-31 (2000).

Geary. "Tables." In *Graphic Java, Mastering the JFC.* 3d edition, Chapter 19, 1132-1283 (1999).

RFC 1155, Rose, M. et al., "Structure and Identification of Management Information for TCP/IP-based Internets," retrieved online at http://www.faqs.org/rfcs/ (1990).

RFC 1157, Case, J. et al., "A Simple Network Management Protocol (SNMP)," retrieved online at http://www.faqs.org/rfcs/ (1990).

RFC 1212, Rose, M. et al., "Concise MIB Definitions," retrieved online at http://www.faqs.org/rfcs/ (1991).

RFC 1901, Case, J. et al., "Introduction to Community-based SNMPv2," retrieved online at http://www.faqs.org/rfcs/ (1996).

RFC 1905, Case, J. et al., "Protocol Operations for Version 2 of the Simple Network Management Protocol (SNMPv2)," retrieved online at http://www.faqs.org/rfcs/ (1996).

RFC 1906, Case, J. et al., "Transport Mappings for Version 2 of the Simple Network Management Protocol (SNMPv2)," retrieved online at http://www.faqs.org/rfcs/ (1996).

RFC 1907, Case, J. et al., "Management Information Base for Version 2 of the Simple Network Management Protocol (SNMPv2)," retrieved online at http://www.faqs.org/rfcs/ (1996).

RFC 2570, Case, J. et al., "Introduction to Version 3 of the Internet-standard Network Management Framework," retrieved online at http://www.faqs.org/rfcs/ (1999).

RFC 2571, Harrington, D. et al., "An Architecture for Describing SNMP Management Frameworks," retrieved online at http://www.faqs.org/rfcs/ (1999).

RFC 2572, Case, J. et al., "Message Processing and Dispatching for the Simple Network Management PRotocol (SNMP)," retrieved online at http://www.faqs.org/rfcs/ (1999).

RFC 2573, Levi, D. et al., "SNMP Applications," retrieved online at http://www.faqs.org/rfcs/ (1999).

RFC 2574, Blumenthal; U. et al., "User-based Security Model (USM) for version 3 of the Simple Network Management PRotocol (SNMPv3)," retrieved online at http://www.faqs.org/rfcs/ (1999).

RFC 2575, Wijnen, B. et al., "View-based Access Control Model (VACM) for the Simple Network Management Protocol (SNMP)," retrieved online at http://www.faqs.orq/rfcs/ (1999).

RFC 2578, McCloghrie, K. et al., "Structure of Management Information Version 2 (SMIv2)," retrieved online at http://www.faqs.org/rfcs/ (1999).

RFC 2579, McCloghrie, K. et al., "Textual Conventions for SMIv2," retrieved online at http://www.faqs.org/rfcs/ (1999).

RFC 2580, McCloghrie, K. et al., "Conformance Statements for SMIv2," retrieved online at http://www.faqs.org/rfcs/ (1999).

RFC 3410, Case, J. et al., "Introduction and Applicability Statements for Internet Standard Management Framework," retrieved online at http://www.faqs.org/rfcs/ (2002).

RFC 3411, Harrington, D. et al., "An Architecture for Describing Simple Network Management Protocol (SNMP) Management Framework," retrieved online at http://www.faqs.org/rfcs/ (2002).

RFC 3412, Case, J. et al., "Message Processing and Dispatching for the Simple Network Management Protocol (SNMP)," retrieved online at http://www.faqs.org/rfcs/ (2002).

RFC 3413, Levi, D. et al., "Simple Network Management Protocol (SNMP) Applications," retrieved online at http://www.faqs.org/rfcs/ (2002).

RFC 3414, Blumenthal. U. et al., "User-based Security Model (USM) for version 3 of the Simple Network Management Protocol (SNMPv3)," retrieved online at http://www.faqs.org/rfcs/ (2002).

RFC 3515, Wijnen, B. et al., "View-based Access Control Model (VACM) for the Simple Network Management Protocol (SNMP)," retrieved online at http://www.faqs.org/rfcs/ (2002).

RFC 3416, Presuhn, R. et al., "Version 2 of the Protocol Operations for the Simple Network Management Protocol (SNMP)," retrieved online at http://www.faqs.org/rfcs/ (2002).

RFC 3417, Presuhn, R. et al., "Transport Mappings for the Simple Network Management Protocol (SNMP)," retrieved online at http://www.faqs.org/rfcs/ (2002).

RFC 3418, Presuhn, R. et al., "Management Information Base (MIB) for the Simple Network Management Protocol (SNMP)," retrieved online at http://www.faqs.org/rfcs/ (2002).

* cited by examiner

Fig. 4

| polled? | view type | editable? | polling interval | indexing variable | version | report errors | data logged |
|---|---|---|---|---|---|---|---|
| 502 | 504 | 506 | 508 | 510 | 512 | 514 | 516 |

| column type | indexed | data type | column position | editable? | graphable data? | request group |
|---|---|---|---|---|---|---|
| 602 | 604 | 606 | 608 | 610 | 612 | 614 |

600

```xml
<?xml version="1.0" encoding="UTF-8"?>
<flextablelist>
    <flextable
highlightBackground="153,204,255,255"
class="com.enterasys.netsight.atlas.fle
xview.fvTable" font="dialog-plain-11"
id="InterfaceFlexView"
columnSelectionAllowed="false"
autoCreateColumnsFromModel="false">

<tableModel>com.enterasys.netsight.shar
ed.tables.EFTableModel</tableModel>

<column
id="SNMP;false;15;6;false;false;4"
class="com.enterasys.netsight.atlas.fle
xview.fvTblCol"
modelIndex="6">Description
        <notes></notes>

<dataField>ifDescr</dataField></column>
      .
      .
      .
<dataField>0;0;true;30;ifEntry;V.0.0.0.
2;0</dataField></flextable></flextablel
ist>
```

Fig. 6

EDITING A PORTABLE, DYNAMIC AND ABSTRACT VIEW DEFINITION OF A NETWORK OBJECT DATABASE

RELATED APPLICATIONS

This application claims the benefit under 35 U.S.C. §119(e) to commonly-owned U.S. provisional patent application serial No. 60/428,586, titled A SYSTEM AND METHOD FOR CREATING AND EDITING A DYNAMIC, ABSTRACT AND PORTABLE VIEW OF A NETWORK OBJECT DATABASE, filed on Nov. 22, 2002, which is hereby incorporated by reference in its entirety.

"Commonly-owned U.S. patent application Ser. No. 10/627,327, now U.S. Pat. No. 7,480,917, titled USER INTERFACE FOR EDITING OBJECTS OF A NETWORK OBJECT DATABASE, by James P. Richmond et al. (the Richmond application) filed on even date herewith is hereby incorporated by reference in its entirety."

BACKGROUND

Communications networks continue to have a growing role in today's world. FIG. 1 is a conceptual diagram illustrating an example of a communications network 100. As used herein, a "communications network" or a "network," for example, network 100, is group of two or more devices (i.e., network elements), for example, network devices 102, 104 and 106, interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more.

As networks become more complex and continue to include more network devices, the importance of efficiently managing these devices has grown. As used herein, a "network device" is a device configured as part of a network. Such network devices may be and/or include any of a variety of types of devices, including, but not limited to, switching devices, workstations, personal computers, terminals, laptop computers, end stations, servers, gateways, registers, directories, databases, printers, fax machines, telephones, transmitters, receivers, repeaters, and any combinations thereof.

Managing network devices is referred to herein as "device management," and includes, inter alia, configuring a plurality of network devices, where one or more these network devices are typically configured remotely (i.e., from another network device residing at a different location on the network) by exchanging messages (e.g., packets) between network devices over network media.

To facilitate configuring large numbers of network devices, object types often are defined to represent aspects of network devices, for example, status, location (e.g., Internet Protocol (IP) address and/or Media Access Control (MAC) address), port characteristics, device description, other aspects, permissible states of any aspects, or any combination thereof.

Objects

The term "object" is often used inconsistently in the field of communications networks, including the field of device management. The meaning of the term "object" and related terms as used herein will now be defined.

As used herein, an "object" is an abstraction representing a specific occurrence (i.e., an instance) of an object type.

As used herein, an "object type" is an abstraction representing a type of thing, for example, a type of thing associated with a network device, for example, the network device itself, a Virtual Local Area Network (VLAN), an interface of the network device, any aspects thereof, other aspects, or any combination thereof.

For example, an object type may define an interface of a network device, where a specific object of the object type may be instantiated for a particular interface of a particular network device.

An object type may include one or more other object types and may be included within one or more other object types. Accordingly, an object type may define interrelationships between object types and may define an organizational structure of object types.

Some object types, referred to herein as "non-indexed" object types (and often referred to as zero-instanced object types), are configured such that only a single object of the object type can occur (i.e., can be instantiated) per network device. For example, an object type may define an operating system for a network device, for which only a single object occurs for each network device.

Other object types, referred to herein as "indexed" object types are configured such that one or more objects of the object type may occur for a single network device. In such case, where one or more objects of a same object type may occur for a single device, each object may be referred to as an "occurrence" (i.e., an instance) of the object type, and each occurrence may be indexed by an indexing variable. For example, an object type defining an interface of a network device may have one or more objects occur per network device, and each of these objects may be referred to as an occurrence of the object type, i.e., an occurrence of an interface. Further, the interface object type may be defined to include several other object types, and each such object type may occur one or more times on a network device, i.e., once for every occurrence of the interface object type.

Network Object Database

A plurality of objects may be grouped together to form a network object database. As used herein, a "network object database" is an organized collection of one or more network objects.

As used herein, a "network object" is an object representing a specific occurrence (i.e., an instance) of an network object type. A "network object type" is an object type representing a type of thing associated with a network device, for example, the network device itself, a Virtual Local Area Network (VLAN), an interface of the network device, any aspects thereof, other aspects, or any combination thereof.

An example of a network object database is a Management Information Base (MIB). A network object database may be any of a variety of types of databases, for example, an object-oriented database, a flat file database, a relational database, or combination thereof. Some network object databases organize network object types into object type groups and/or tables, where the database schema of such database may divide several logically-related object types into several tables and/or object type groups. For example, some MIBs include an interface group, a system group, and/or a VLAN group, etc. A device management application may be configured to understand such relationships, and a programmer or other person experienced in working with the database may know such relationships. Typically, however, a user (e.g., a network administrator) has limited knowledge or understanding of the relationships between such tables and table entries.

An indexed object type (e.g., an interface) of a network object database (e.g., a MIB) may include a table object type defining a table for the indexed object type. The table object type includes an object type that defines an indexing variable for the table and other object types that define columns for the table. The table object type may be defined such that each occurrence of the indexed object type is indexed by the indexing variable and may be considered an entry or row of the table. The column object types may be defined to occur once for each occurrence of the indexed object type, i.e., once for each entry or row of the table.

To facilitate the widespread use of network object databases to manage devices, several technologies, standards and protocols have been developed. Some of these standards have been developed to define a language for structuring management information, including the Structure of Management Information (SMI) promulgated by the Internet Engineering Task Force (IETF), including IETF Standard No. 16, which defines Version 1 of the SMI as documented in Request for Comments (RFCs) 1155 and 1212, and IETF Standard No. 58, which defines Version 2 of the SMI as documented in RFCs 2578, 2579 and 2580.

Other protocols have been developed to enable a user to manage objects and object types of a network object database (e.g., a MIB). Managing a database of network objects may include accessing (e.g., remotely) and manipulating (e.g., getting and setting) object types and occurrences thereof, including modifying the definition of an object type and/or changing a value defined for an object. An example of a protocol for managing a MIB is the Simple Network Management Protocol (SNMP) promulgated by the IETF. There are several different versions of SNMP, including SNMPv1 (version 1) as defined by IETF Standard No. 15 and documented in RFC 1157, SNMPv2c, which is not a standard, but is an experimental version of SNMP as documented in RFC 1901, and SNMPv3 defined by IETF Standard No. 62 and documented in RFCs 3410-3418, which are updated versions of RFCs 1905-1907 and 2570-2575.

Accordingly, a network object database, for example, a MIB, may be configured to conform with one or more of the SMI protocols and one or more of the SNMP protocols. A network object database also may include proprietary elements that do not conform with any standards or protocols.

Views

As used herein, a "view" of a network object database (e.g., MIB) is a visual representation of information derived from the network object database. The visually represented information may be any information derived from the network object database, for example, the values of one or more objects on a network device. A view typically represents a subset of the information available from a network object database, and typically is used by a user to determine the state of one or more network objects on one or more devices. As used herein, a "view definition" is a set of computer-readable signals that defines a view. As used herein, a "set" of items may include one or more of such items. A view definition includes a definition of the information to be represented by the view.

A network object database may be considered a layer of abstraction for aspects of a network device. Views of a network object database may be classified as abstracted or non-abstracted. As used herein, a "non-abstracted view" is a view of a network object database that provides no more abstraction (i.e., no additional layer of abstraction) for network objects beyond the layer of abstraction provided by the network object database itself. Thus, a non-abstracted view visually represents only information defined in the network object database.

Also, non-abstracted views are limited to arranging the display of information from the network object database as defined by the network object database itself. For example, such non-abstracted view delimits objects only in accordance with the delimitations defined by the network object database. Further, existing non-abstracted view definitions do not combine or collate object types of different groups or different tables of a network object database into an integrated arrangement, e.g., a table that includes object types from both groups or tables.

Typically, relatively simple interpretive (as opposed to compiled) programming language such as a scripting language (e.g., Practical Extraction and Reporting Language (PERL)) are used to write instructions in code (e.g., a script) to retrieve network objects to produce a non-abstracted view. Using a programming interface (e.g., an editor), a programmer may write a script that defines requests for objects defined for one or more network devices, and then execute the script.

As used herein, a "programming interface" is a set of one or more applications, or parts thereof, that enable a programmer to create and modify an application. A programming interface may be configured to use one or more Application Programming Interfaces (APIs), The programmer must know how to write programming code using the programming interface and/or understand the functionality defined by blocks of code (e.g., building blocks of an API) and how to properly combine them.

The result of executing a script on a network object database typically is a raw dump of information including values of objects of the requested object types. The information typically is visually arranged according to the arrangement of the objects within the network object database, which is defined by the object types therein. The information is typically is arranged as a string of text with delimiters (e.g., spaces, line spaces, carriage returns, commas, semicolons) separating objects.

Thus, such relatively simple programming languages do not enable a programmer to define an abstract view of a network object database, including configuring an arrangement of network objects different than the arrangement defined by the network object database, and/or defining a graphical arrangement of such network objects, for example, a table. Thus, the information displayed and the arrangement of information displayed is limited to the information and arrangement defined by the network object database.

As a result, such non-abstracted views may have little meaning to the user (relative to the meaning provided by an abstract view definition), and the logical relationships between pieces of information visually represented in the view may be difficult for the user to understand or may not be understood by the user at all.

Further, the scripts written by such relatively simple programming languages do not provide a user interface that enables a user to create and modify a view definition.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

Some known applications, for example, NetSight Element Manager, version 3.0.0, available from Enterasys Networks, Inc. of Rochester, New Hampshire, can provide abstracted views of a network object database. Typically, programmers can create and modify abstract view definitions for such applications using a programming interface.

As used herein, an "abstracted view" is a view of a network object database that provides a layer of abstraction of network objects beyond the layer of abstraction provided by the network object database itself. A definition of an abstracted view (i.e., view definition) may specify information beyond the information defined in the network object database, for example, different names for the objects than the names provided by the network object database. Further, the view definition for an abstracted view may define a visual arrangement (e.g., a table) of the information to be represented that is different than the visual arrangement defined by the network object database. For example, an abstracted view may define a table that includes object types that belong to different object type groups or different tables of a network object database.

Similar to the limitations described above with respect to scripts, applications for which programmers can define abstracted views do not provide a user interface that enables a user to create and modify a view definition for a network object database.

In contrast, the static views provided by such applications can only be created and modified by programmers, for example, using a programming interface. As used herein, a "static view definition" is a view definition of a network object database that is not capable of being created and/or modified without programming intervention to create or change the programming code in which the view definition is written (e.g., using a programming interface).

Static view definitions restrict users to view definitions configured by a programmer, for example, when a viewing application is installed. Further, the view definition may be restricted to those object types that were known when the viewing application was installed. Accordingly, to modify a view definition, including possibly adding new object types to the view definition, or to create a new view definition, the code defining the viewing application must be modified. Such modification adds additional time and, consequently, cost to managing network devices.

Another problem with known applications that provide abstracted views of a network object database is that the view definitions of such views are typically inextricable from the viewing application and, therefore, are not portable. In other words, a user using a first network device cannot separate a view definition from the viewing application and transport the view definition to another network device where the view defined by the view definition can be reproduced using a suitable viewing application. Transporting a view definition may include transmitting the view to another device over network media (e.g., by attaching to an email), or saving a copy of the view to a portable recording medium such as a memory stick, CD ROM or floppy disk and physically transporting the recording medium to another network device.

SUMMARY

In an aspect of the invention, a user interface is provided that enables a user to edit a dynamic and abstract view definition, for example, a dynamic table, of a network object database, for example, a MIB. As used herein, to "edit" a view definition means to do at least one of: create, modify and delete a view definition, and to "modify" a view definition means to do at least one of: add an object type to the view definition, remove an object type from the view definition, add a column definition to the view definition, change a column definition, and remove a column definition from the view definition.

In an optional feature of this aspect, the view definition may be portable.

In another optional feature, object types of different object type groups or different object type tables of a network object database (e.g., a MIB), may be added to a same view definition.

In another aspect of the invention, a user is enabled to edit a portable view definition (e.g., a portable table) of a network object database (e.g., a MIB). As used herein, a "portable" view definition of a network object database is a view definition, edited on a device (e.g., a network device) using a suitable application, that is capable of being extricated from the application and transported to another device where it can be edited and/or viewed using a suitable application.

Such portable view definition may be defined as part of a document, for example, a document formatted in accordance with a markup language, e.g., a document formatted in accordance with XML (an "XML document"). Such document may include not only the definition of the view but information for requesting objects to populate the view. For example, such structured document may include request information for constructing an SNMP request to retrieve objects from one or more network devices.

In features of this aspect, the portable view definition may be abstract and/or dynamic.

In an embodiment of the invention, a user is enabled to edit a table defining a view of a network object database, e.g., a MIB, including a plurality of network object types. A user interface, which may include a GUI, is provided that enables the user to specify one or more of the plurality of network object types. In response to the user specifying the one or more network object types, at least one column of the table is edited to represent at least one of the one or more specified network object types.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment, a system is provided for enabling a user to edit a table defining a view of a network object database including a plurality of network object types. The system includes a table editing component to enable the user to specify one or more of the plurality of network object types. The table editing component is operable, in response to the user specifying the one or more network object types, to edit at least one column of the table to represent at least one of the one or more specified network object types, respectively.

In another embodiment, a system is provided for enabling a user to edit a table defining a view of a network object database including a plurality of network object types. The system includes a table editing component to edit at least one column of the table to represent at least one of the plurality of network object types specified by the user. The system further includes means for enabling the user to specify the at least one or more of the plurality of network object types.

In yet another embodiment, a portable view definition of a network object database including a plurality of network object types is edited. A column of a table is edited to represent one of the plurality of network object types. Request information is generated for retrieving objects of the one network object type. Such request information may be configured in accordance with one or more known protocols, for example, SNMP. A document is generated that includes a definition of the table, the table definition including the generated request information and a definition of the column. This document may be formatted in accordance with a markup language, for example, XML.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment, a system is provided for configuring a portable view definition of a network object database including a plurality of network object types. The system includes: a table editing component to edit a column of a table to represent one of the plurality of network object types; a request component to generate request information for retrieving objects of the one network object type; and a document generation component to generate a document that includes a definition of the table, including the generated request information and a definition of the column.

In another embodiment, a system is provided for configuring a portable view definition of a network object database including a plurality of network object types. The system includes: a table editing component to edit a column of a table to represent one of the plurality of network object types; a request component to generate request information for retrieving objects of the one network object type; and means for generating a document that includes a definition of the table, the table definition including the generated request information and a definition of the column.

In yet another embodiment, a computer-readable medium is provided, having stored thereon s plurality of computer-readable signals defining a document. The document includes a definition of a table representing a view of a network object database including a plurality of network object types. The table definition includes a column representing one of the network object types of the network object database and request information for retrieving objects of the network object type represented by the column.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 4 is a block diagram illustrating an example of a data structure for representing request information for retrieving objects of a network object database;

FIG. 5 is a block diagram illustrating another example of a data structure for representing request information for retrieving objects of a network object database;

FIG. 6 is an example of an XML document specifying object types and request information;

DETAILED DESCRIPTION

The function and advantages of aspects of the present invention will be more fully understood from the examples described below. The following examples are intended to facilitate an understanding of such aspects and to illustrate the benefits of such aspects, but do not exemplify the full scope of the invention.

Although aspects of the invention described below are described primarily in relation to editing views of a network object database, for example, a MIB, such aspects are not limited thereto, but may be applied to editing views of any database of objects. Further, although a table is the primary visual representation of an abstracted view described herein, aspects of the invention include a definition of an abstracted view that defines any of a variety of types of visual representations, including, but not limited to, a diagram (e.g., an object-oriented diagram), a chart, an image, any combination thereof, and any combination of a table and one of the foregoing.

Aspects of the invention described herein may be implemented using NetSight Atlas Console available from Enterasys Networks, Inc. of Rochester, New Hampshire.

As used herein, whether in the written description or the claims, the terms "comprising", "including", "carrying", "having", "containing", "involving", and the like are to be understood to be open-ended, i.e., to mean including but not limited to.

EXAMPLES

Figure 1:
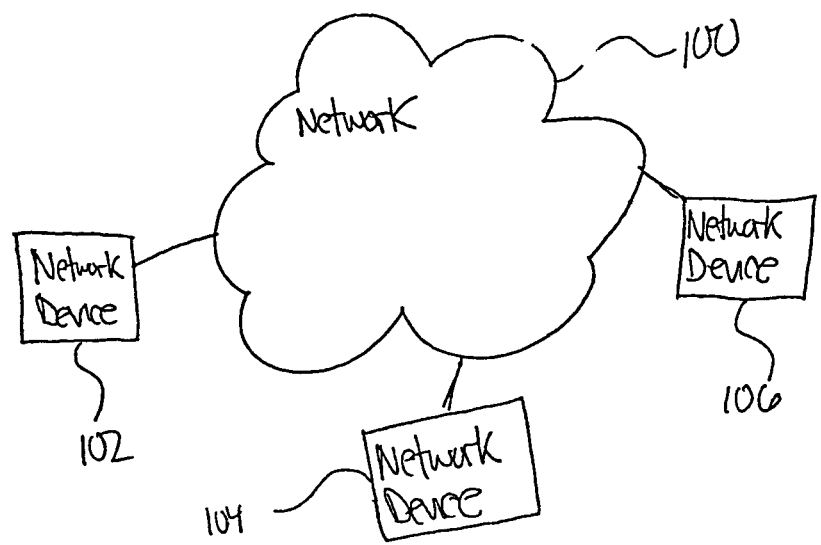
FIG. 1 is a block diagram illustrating an example of a communications network.
Figure 2:
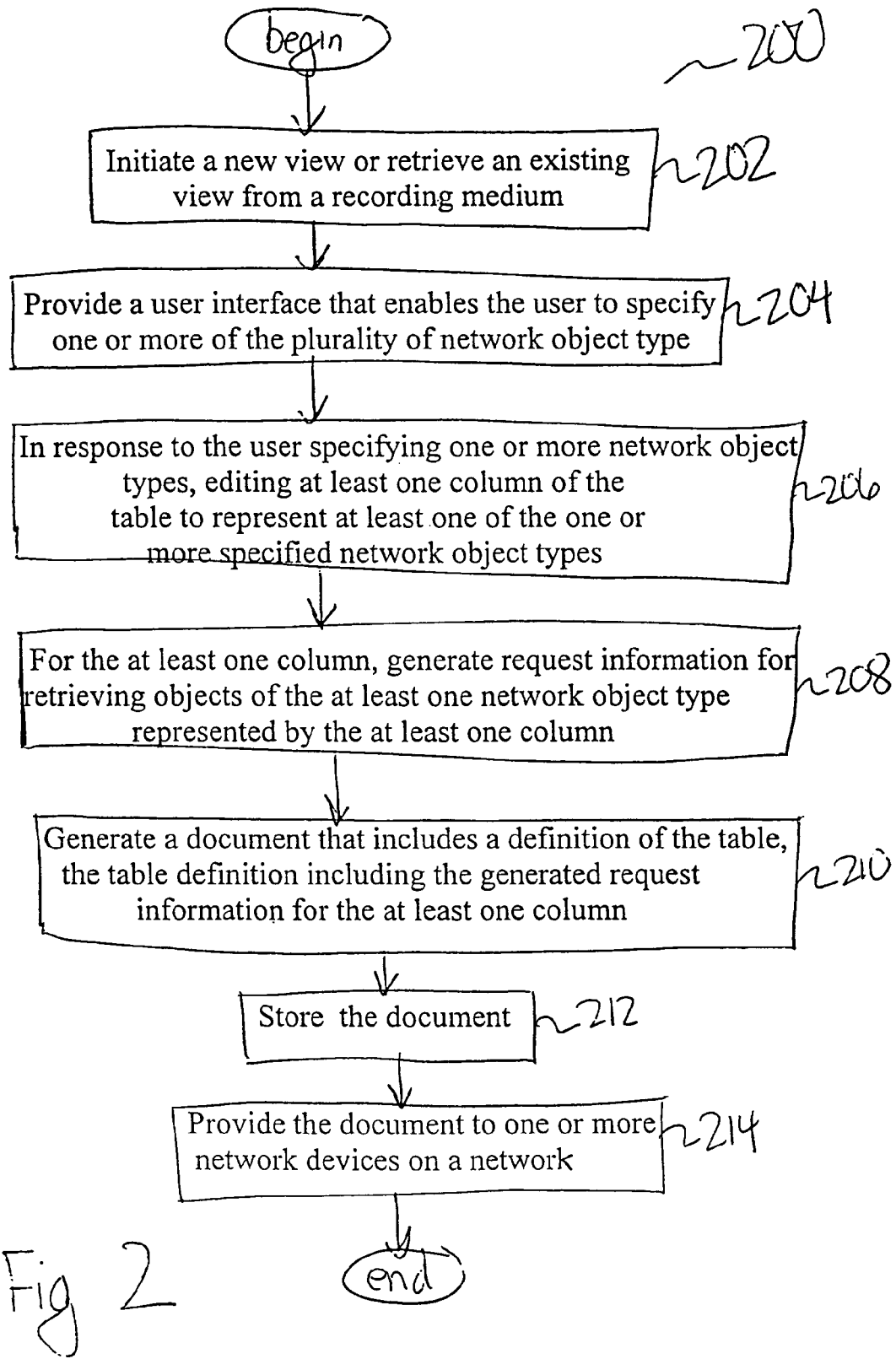
FIG. 2 is a flow chart illustrating an example of a method of enabling a user to edit a table defining a view of a network object database.

FIG. 2 is a flow chart illustrating an example of a method 200 of enabling a user to edit (e.g., create, modify and/or delete) a table defining a view of a network object database (e.g., a MIB).

Figure 3:
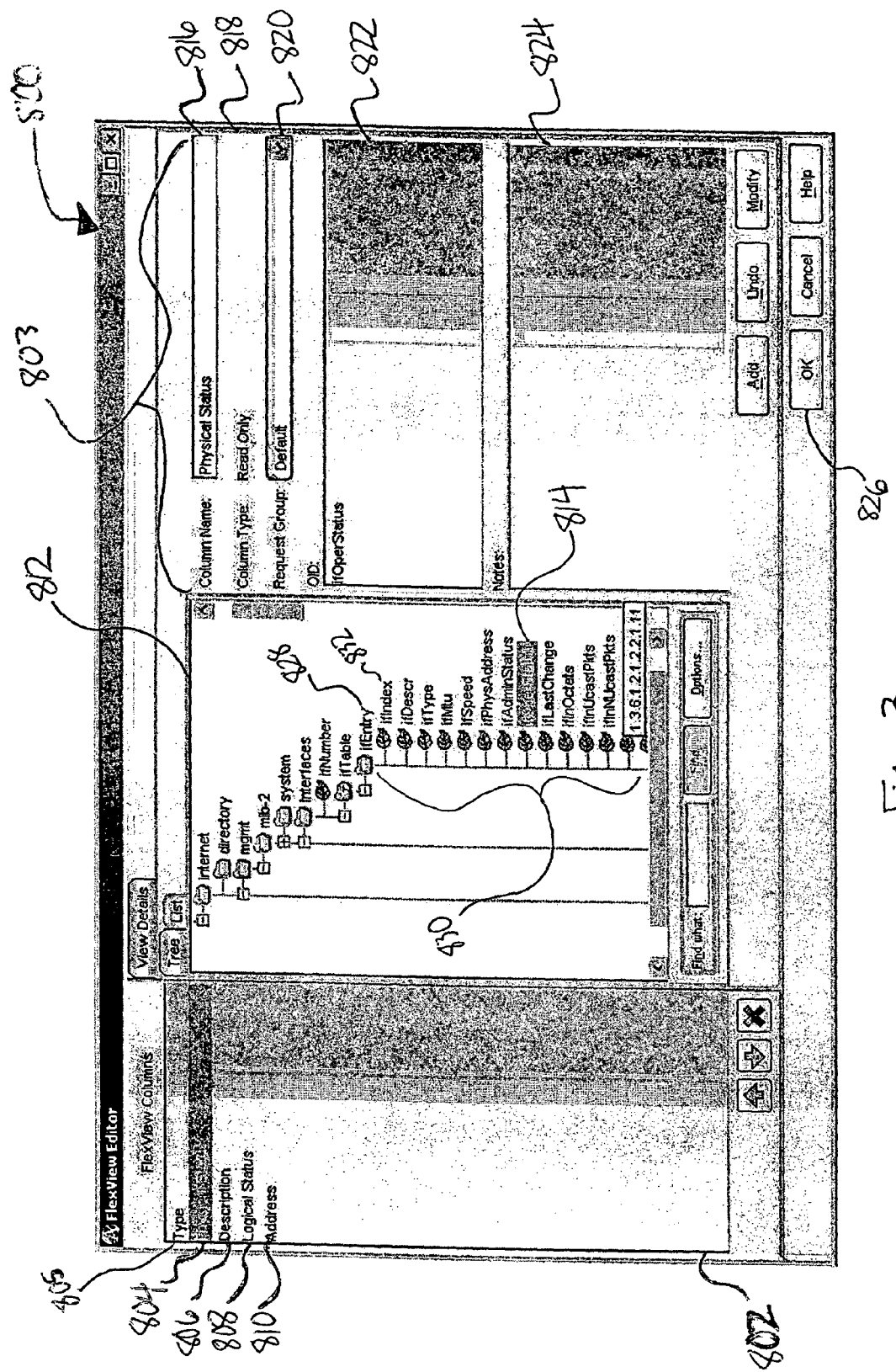
FIG. 3 is a screen shot illustrating an example of a display provided by a graphical user interface for editing a view of a network object database.

In Act 202, a new view may be initiated or an existing view may be retrieved from a recording medium, for example, by a user using a user interface, which may include a visual user interface, for example, a graphical user interface (GUI), which may provide a GUI display such as GUI display 800 of FIG. 3.

As used herein, a "visual user interface" is the portion of the user interface that defines how information is visually presented (i.e., displayed) to the user, and defines how the user can navigate the visual presentation (i.e., display) of information and input information in the context of the visual presentation. During execution of the application, the visual interface controls the visual presentation of information and enables the user to navigate the visual presentation and enter information in the context of the visual presentation. Types of visual user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces.

As used herein, the visual presentation of information presented by a user interface, visual user interface or GUI is referred to as a "user interface display", "visual user interface display" or a "GUI display", respectively.

In Act 204, a user interface may be provided that enables the user to specify one or more of a plurality of network object types included in the network object database. For example, the user interface may include a graphical user interface (GUI) for example, a GUI that provides the GUI display 800 described below in relation to FIG. 3. Such GUI may provide one or more controls that enable a user to select from among the plurality of object types.

FIG. 3 is a screenshot illustrating an example of a GUI display 800 for editing an abstracted, dynamic view of a network object database (e.g., a MIB). GUI display 800 may be provided as part of Act 202 and/or Act 204. Although any of a variety of visual user interfaces, and displays provided thereby, may be used to implement one or more acts of methods 200 and 700, GUI display 800 will be used to assist in illustrating several of the acts of these methods.

Although GUI display 800 is used to illustrate a visual user interface for defining a view for a MIB, aspects of the invention are not limited thereto, as a visual user interface may be configured to enable a user to edit a view of any kind of network object database.

GUI display 800 may include column selection panel 802, object type selection panel 812 and column information panel 803. Object type selection panel 812 may display a list or a tree representation of object types of a network object database. Each folder displayed in the tree may represent an object type that includes other object types, and each leaf may represent an object type that does not include any other object types. The object type selection panel may be configured to enable a user to traverse the list and/or tree representation and select an object type. Other types of displays may be used to display object types and enable the user to navigate the display and/or select an object type.

Controls may be provided to traverse the list or the tree and to select one of the object types from the list or tree. If an existing view is being modified, or after a column has been added to the table defining the view, method 200 may include enabling the user to select any of the columns of the view from column selection panel.

During the course of editing the table, one or more inputs may be received from a user specifying one or more of the plurality of network objects types, as is described in more detail below in relation to FIG. 7.

Returning to FIG. 2, in Act 206, at least one column of the table may be edited to represent at least one of the one or more network object types specified by the user. For one or more network objects selected by the user, columns may not be edited because such objects may not be compatible with the table, as described below in relation to FIG. 7.

In Act 208, for the at least one edited column, request information may be generated for retrieving objects of the specified object type represented by the at least one column. For example, the request information may be information used to create an SNMP request to retrieve objects of the object type from one or more devices.

Although Act 208 describes request information as being generated in relation to a specific column, it should be appreciated that request information may be generated that corresponds to the table as a whole. FIGS. 4 and 5 illustrate data structures for arranging request information for a table and column, respectively. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium, for example, of a network.

FIG. 4 is a block diagram illustrating an example of a table request data structure 500 for representing request information for retrieving objects of a network object database.

Data structure 500 may include one or more fields, including any of polled field 502, view type field 504, editable field 506, polling interval field 508, indexing variable field 510, version field 512, report errors field 514 and data logged field 516.

Polled field 502 may be configured to store a value indicating whether network devices are to be polled periodically to populate the view table. Polling a device means sending a request to the device, the request requesting that the device return an indication of objects present on the device. If field 502 has a value indicating that network devices are to be polled, then the interval at which the requests are sent (i.e., polling interval) may be defined by polling interval field 508.

View type field 504 may store a value indicating the type of view, for example, table, pie graph or bar graph. Although the primary type of view described herein is a table, other types of views are possible, such as a pie graph or bar graph, which may be appropriate only for views that include appropriate objects types.

Editable field 506 may store a value indicating whether the table is editable. This field may be configured such that the value stored therein overrides the value stored in editable field 610 of column request data structure 600 described below in more detail, or may be configured to be overrideable by the value stored in field 610.

Indexing variable field 510 may store a value indicating the indexing variable for the table. Such indexing variable may be any of a variety of kinds of indexing variables, including an interface indexing variable or a VLAN indexing variable. Indexing variables are described below in more detail in relation to FIG. 7.

Versioning field 512 may store a value indicating a version of the table. For example, the table may be revised on several occasions and versioning field 512 may be used to identify a version of each revision and to implement some sort of versioning control for the table.

Report errors field 514 may store a value indicating whether or not to report errors that occur during the population of the table, i.e., when the table is applied to one or more network devices to produce a view.

Data logged field 516 may indicate whether to log values of objects that populate the view table.

It should be appreciated that one or more of fields 502-516 may be combined. For example, for multiple fields for which a Boolean value may be used, a single field may be configured to store a binary value, where each digit of the binary value represents a Boolean value for a different parameter. For example, report errors field 514 and data logged field 516 may be combined into a single field, where a two-digit binary number is used to represent the values for the two fields. A first binary digit may represent the Boolean value for whether or not to report errors and the second binary digit may represent the Boolean value for whether or not to log object values.

FIG. 5 is a block diagram illustrating an example of a column request data structure for representing request information for retrieving objects of a network object database. Column type field 602 may store a value indicating a type of a column. For example, the column type may be defined to be a column representing a writable object, or a column representing a read-only object, or any of a variety of other types of objects. When the view is being generated, the values stored in the column type field 602 may be used to determine how values of the object represented by the column are processed.

Indexed field 604 may store a value indicating whether the object type represented by a column is indexed or non-indexed.

Data type field 606 may store a value indicating the data type of the object type represented by a column. Data types may include, but are not limited to, a number, string, Boolean value or other value. The permissible data types for field 606 may be defined in accordance with one or more standards, for example, Abstract Syntax Notation 1 (ASN.1).

Column position field 608 may store a value indicating the position of the column within a data structure representing the table. For example, if the table includes six columns, then a data structure representing the structure may include six fields. The value stored in column position 608 may represent the position of the field that represents the column within the six fields of the data structure. It should be appreciated that the position of this field may correspond to the position of the column within the table or may be independent of the position of the column within the table.

Editable field 610 may store a value indicating whether the column is editable, i.e., whether the column is read-only or read/write.

Graphable data field 612 may store a value indicating whether the object type represented by the column is graphable. As described above, a view may be configured to display a pie graph, bar graph or other type of graph or diagram. Graphable data field 612 may store the value indicating whether the data type of the object type represented by this column is capable of being graphed.

Request group 614 may store a value indicating a request group to which the column belongs. As described above, a protocol for managing network devices, for example, a version of SNMP, may be configured to predefine groups of object types. Such protocol may be configured so that, if an attempt to retrieve one object of the object type group from a network device, as part of the request to retrieve one or more objects of the object type group, fails, then the entire request fails (i.e., no objects are returned for the request). Accordingly, it may be desirable to divide a request into multiple requests, where each request includes one or more object types, so that if one request fails because of the inability to retrieve an object, the other requests may not fail. As a result, the objects for at least some object types may successfully be retrieved.

Thus, in an aspect of the invention, a user may be enabled to divide the columns of a view table into different request groups. The number of request groups to create for a view may be based on several factors. For example, one benefit to increasing a number of requests is that the greater the number of requests, the greater the likelihood that at least some objects will be retrieved successfully. However, as the number of request groups increases (at most, one request group per column type in the view), network traffic increases as well. A request group may be defined for a column using a GUI, for example, by entering and/or selecting a value in request group field 820 of GUI display 800.

Returning to method 200, in Act 210, a document may be generated that includes a definition of the table, the table definition including a definition of the column and the generated request information. For example, a document formatted in accordance with a markup language ("markup language document") such as an XML document may be generated. The Appendix illustrates an example of an XML document that may be generated, which includes a definition of a table. The table definition includes a definition of a plurality of columns, where a plurality of the column definitions include request information generated for the column. The table definition further includes request information corresponding to the table as a whole.

FIG. 6 is a block diagram illustrating an example of an XML document 900 including a definition of a table defining an abstracted view of a network object database. XML document 900 includes table definition 902, which may include table identifier 904, one or more column definitions 906 and request information 914 corresponding to the table defined by table definition 902. Request information 914 may include semicolon-delimited values 916, 918, 920, 922, 924, 926 and 928, which may represent values for fields 502-516, respectively of data structure 500 described above with respect to FIG. 4. These values may be used to generate requests to retrieve network objects on network devices to populate a view defined by table definition 902.

Column definition 906 may include request information 908 corresponding to a column, column name 910 and network object type identifier 912.

Request information 908 may include values 930, 932, 934, 936, 938, 940 and 942, which may be values for fields 602, 604, 606, 608, 610, 612 and 614, respectively, of data structure 600 described above with respect to FIG. 5. These values may be used to generate requests that specify retrieving network objects of the object type represented by column definition 906 from network devices.

Column definition 906, including request information 908 may be edited and generated as described above with respect to Acts 718-722 of method 700.

Returning to method 200, in Act 212, the document may be stored, for example, on a recording medium such as a non-volatile recording medium. In an embodiment in which an existing view is being edited, Act 212 may include replacing the previous structured document including the table with the updated structured document resulting from the performance of Acts 204-210.

In Act 214, the document may be provided to one or more network devices on a network. For example, the document may be stored on a disk and transported to another device on the network, or transmitted across one or more transmission mediums of the network to another network device. The document may be transmitted as part of a file transfer or attached as part of another communication such as an electronic mail (email) message. A user at one of these network devices to which the document was transmitted then may access the document using an appropriate application (e.g., the application described below in relation to FIGS. 8-10). The user may use the view definition and request information encapsulated within the document to produce a view of objects residing on one or more network devices.

Figure 7:
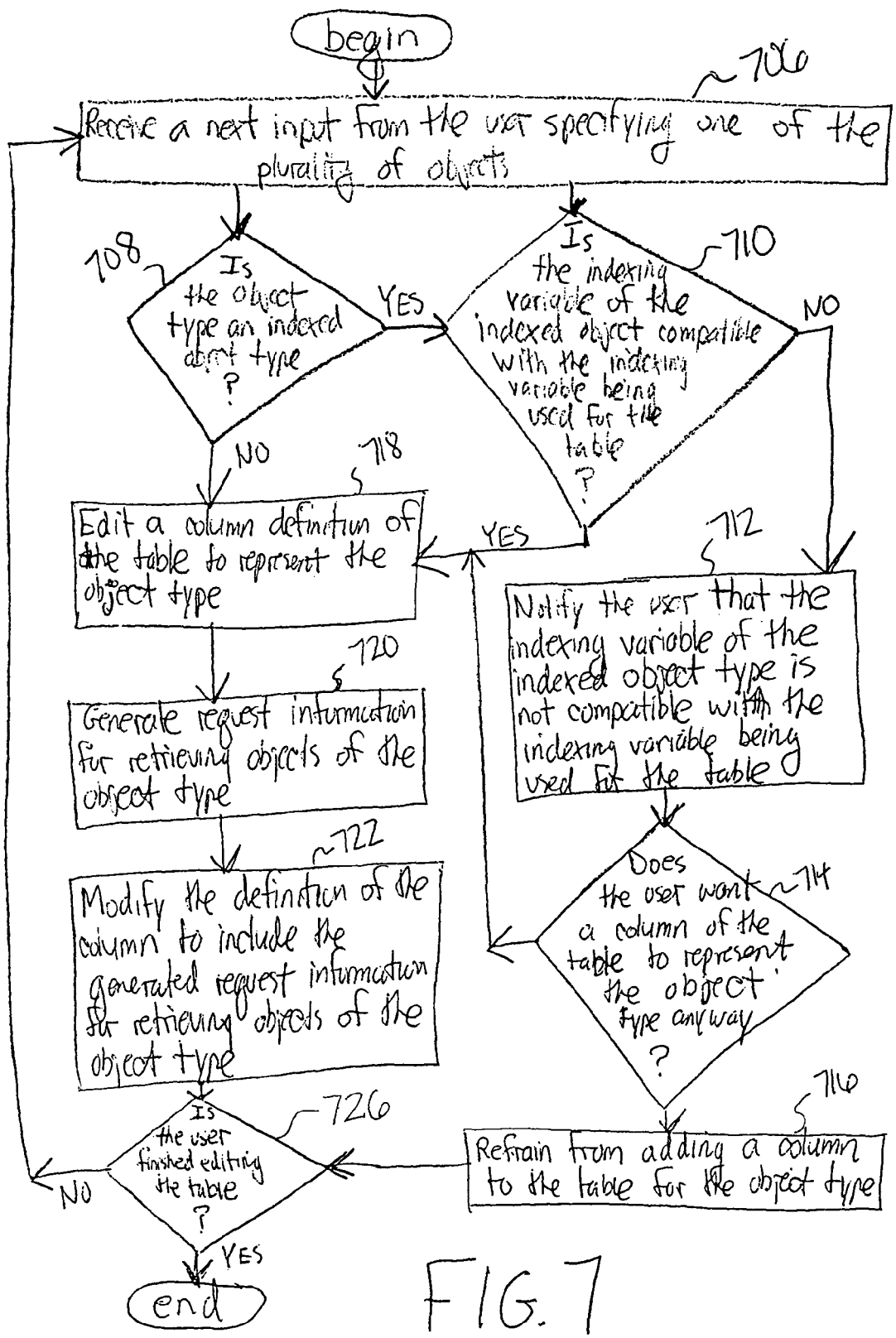
FIG. 7 is a flow chart illustrating an example of a method of editing one or more columns of a table defining a view of a network object database and generating request information for the one or more columns.

FIG. 7 is a flow chart illustrating a method 700 of editing one or more columns of a table defining a view of a network object database and generating request information for the one or more columns, for example, as part of Acts 206 and 208 of method 200.

In Act 706, a next input may be received from the user specifying one of the plurality of object types. For example, an input may be received resulting from a user selecting (e.g., clicking a mouse on) one of the leaves of object type selection panel 812 of GUI display 800.

If the user is modifying a table that already includes one or more columns, then method 700 may include an act of receiving an input from the user specifying a column of the table (not shown). Such act may occur prior to Act 706 or any point after Act 706 prior to the performance of Act 718. For example, the user may select one of the columns (e.g., Physical Status column 804, Type column 805, Description column 806, Logical Status column 808 or Address column 810) listed in column listing panel 802 of GUI display 800.

In Act 708, it may be determined whether the object type is an indexed object type. As described above, an indexed object type is an object type for which one or more occurrences of an object of the object type may be implemented on a single network device. For example, referring to object type selection panel 812, ifEntry 828 is an indexed object type that includes indexed object types 830, where ifndex is the indexing variable for object types 828 and 830.

If it is determined that the object type is not an indexed object type, then method 700 may proceed to Act 718, described below.

If it is determined that the object is an indexed object type, then it may be determined in Act 710 whether the indexing variable of the indexed object type is compatible with the indexing variable being used for the table. For example, the indexing variable used for the table may be an interface indexing variable or a VLAN indexing variable. An interface indexing variable may be used by a table defining a view of interfaces (e.g., defined for ports of a network device) on a network. Because multiple interfaces may reside on a single network device, a network object database, such as a MIB, may define an interface to be an indexed object type.

Similarly, a VLAN indexing variable may be used by a table defining a view of VLANs on a network. Because multiple VLANs may reside on a single network device, a network object database, such as a MIB, may define a VLAN to be an indexed object type. It should be appreciated that indexed object types may be used to define other aspects of a network that may occur more than once on a network device, and that VLANs and interfaces are described herein for illustrative purposes.

Returning to Act 710, the indexing variable being used for the table may be determined based on the indexed object type that was the first indexed object type added to the table. For example, the indexing variable of the first object type added to the table may serve as the indexing variable for the table. During the course of editing the table, the user may change the indexing variable, and this change may require removing any indexed object types previously included in the table.

An indexing variable is compatible with another indexing variable if the index variables are the same. Even though two object types are from different tables of a network object database (e.g., different tables of a MIB), these two object types may have a same indexing variable. For example, a MIB interface table may define an indexing variable "if Index" that may be considered an object identifier (OID) of the indexing variable for the indexing table. The indexing variable also may have a numerical object identifier, for example, "1.3.6.1.2.1.2.2.1.1". Another table of the MIB may define an indexing variable by specifying (i.e., pointing to) the OID of the indexing variable of the interface table, for example by specifying "if Index" or "1.3.6.1.2.1.2.2.1.1". Accordingly, the interface table and the other table both use the same indexing variable.

In an embodiment of the invention, a compatibility table may be provided. The compatibility table may include a plurality of entries, where each entry corresponds to a possible indexing variable, and may include a compatibility value. Accordingly, Act 710 may include accessing an entry of the compatibility table corresponding to the indexing variable of the object type specified by the user, and retrieving the compatibility value stored therein. Act 710 also may include accessing the entry of the compatibility table corresponding to the indexing variable being used by the table, and retrieving the value stored therein. Alternatively, the compatibility value being used by the table may have already been retrieved in response to adding to the table the object type from which the indexing variable of the table was determined. The retrieved compatibility value for the specified object type and the compatibility value of the table then may be compared. If the compatibility values match, then the indexing variables are compatible. If the retrieved compatibility values do not match, then the indexing variables are not compatible and, therefore, the object type is deemed not compatible with the table.

If it is determined in Act 710 that the indexing variables are compatible, then method 700 may proceed to Act 718. If it is determined that the indexing variables are not compatible, then, in Act 712, the user may be notified that the indexing variable of the indexed object type is not compatible with the indexing variable being used for the table. For example, a visual user interface may display a message window to the user notifying the user of the incompatibility.

In an embodiment of method 700, after Act 712, method 700 proceeds directly to Act 718 (not shown). In an alternative embodiment, the user is provided the option of editing a column of the table to represent the object type regardless of the fact that the indexing variable of the object type has been determined to be incompatible with the indexing variable of the table. Accordingly, it may be determined in Act 714 whether the user wants to edit a column of the table (e.g., a column being added or modified by the user) to represent the object type even though the indexing variable of the object type has been found to be incompatible with the indexing variable of the table.

Enabling the user to add an object type to a table for which the indexing variable has been determined to be incompatible with that of the table may be desirable for the following reasons. Although a system may implement a network object database in accordance with a standard such as one of the MIB-related standards, some networks are configured with proprietary network object types. Accordingly, a vendor that programmed the compatibility table may not be familiar with all of the object types of a customer's proprietary network object database. Accordingly, even though it has been determined that the indexing variable of an object type is incompatible with an indexing variable of a table based on a vendor's compatibility table, the user may have knowledge that the indexing variable is indeed compatible with that of the table, and it may be desirable to let the user add the object type to the table in this situation.

In Act 714, if it is determined that the user wants a column of the table to represent the object type anyway, then, in Act 718, a column definition of the table may be edited to represent the object type, for example, using column information panel 803 of GUI display 800. The column defined by such column definition may be a column selected by the user, for example, if an existing view is being modified, or the column may be a next column automatically created in response to an object type being selected.

Referring to GUI display 800, after the user selects a compatible object type or a non-indexed object type (i.e., only one occurrence per network device) from object type selection panel 812, a column item for the object type may appear in column list panel 802, and the user may be enabled to enter information for the column in column information panel 803. For example, the user may be enabled to provide a name for the column in name field 816, which may update the name of the item listed in column list panel 802. Further the user may be able to enter a type of the column (e.g., read/write, read-only, etc.) in type field 818. Alternatively, such value may be defined by the object type selected and thus may not be modifiable by the user. Object type identifier field 822 may display an identifier of the column to the user, for example, MIB object identifier (OID) ifOperStatus. Notes field 824 enables a user to enter any information, for example, information pertaining to the object type. The GUI display 800 also may provide a request group field 820 to enable the user to enter and/or select a request group for the column. Request groups are described above in relation to request group field 614 of data structure 600.

As illustrated above in relation to Acts 706-718, a user may be enabled to edit a table view to include object types from different objects type groups or tables defined by a network object database (e.g., a MIB). Objects types from different object type groups and tables may be added to a same view table if such objects types have compatible indexing variables (i.e., the same indexing variable), or if the indexing variables of the object types are different, but a user specifies that the two object types be added to a view table in spite of the incompatibility.

In Act 720, request information for retrieving objects of the object type may be generated, for example, as described above with respect to Act 208 of method 200.

In Act 722, the definition of the column may be modified to include the generated request information for retrieving objects of the object type.

In Act 726, it may be determined whether the user is finished editing the table. For example, a visual user interface (e.g., GUI display 800) may provide a control for the user that the user can select to signify that the user has completed the table, for example, a control button labeled "OK" or "Finished" such as control button 826 of GUI display 800.

If the user is not finished editing the table, method 700 may return to Act 706. Although Act 706 is illustrated as occurring in response to Act 726, it should be appreciated that the reception of a next input 706 may not depend on the performance of Act 726, as performance of Act 706 and 726 may be asynchronous events that may occur at different times during the performance of method 700.

If it is determined that the table is complete, then a document may be generated for the table, as described above in relation to Act 210 of method 200.

Methods 200 and 700 may include additional acts. Further, the order of the acts performed as part of such methods is not limited to the order illustrated in FIGS. 2 and 7 respectively, as the acts may be performed in other orders, and one or more of the acts of methods 200 and 700 may be performed in series or in parallel to one or more other acts, or parts thereof. For example, Acts 718 and 720 of method 700, or parts thereof, may be performed in parallel, and Act 720 may be performed before Act 718.

Each of methods 200 and 700 is merely an illustrative embodiment of enabling a user to edit a dynamic, abstract and/or portable view definition of a network object database. Such illustrative embodiments are not intended to limit the scope of the invention, as any of numerous other implementations of such methods, for example, variations of methods 200 and 700, are possible and are intended to fall within the scope of the invention. None of the claims set forth below are intended to be limited to any particular implementation of enabling a user to edit a dynamic, abstract and/or portable view definition of a network object database unless such claim includes a limitation explicitly reciting a particular implementation.

Each of methods 300, 400 and 700, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBAL, etc., or any of a variety of combinations thereof. The computer-readable medium on which such instructions are stored may reside on one or more of the components of systems 10 and/or 11 described below, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 11 and 12, that perform the functions described above with respect to method 200 and 700 or any combination thereof can be generically considered as one or more controllers that control the above-discussed functions. The one or more controllers can be implemented in numerous ways, such as with dedicated hardware, or using a processor that is programmed using microcode or software to perform the functions recited above.

Various aspects of the invention are described above for editing a dynamic, abstracted view definition of a network object database and storing the same in a portable format.

Applying such view definition to one or more network devices will now be described.

Figure 8:
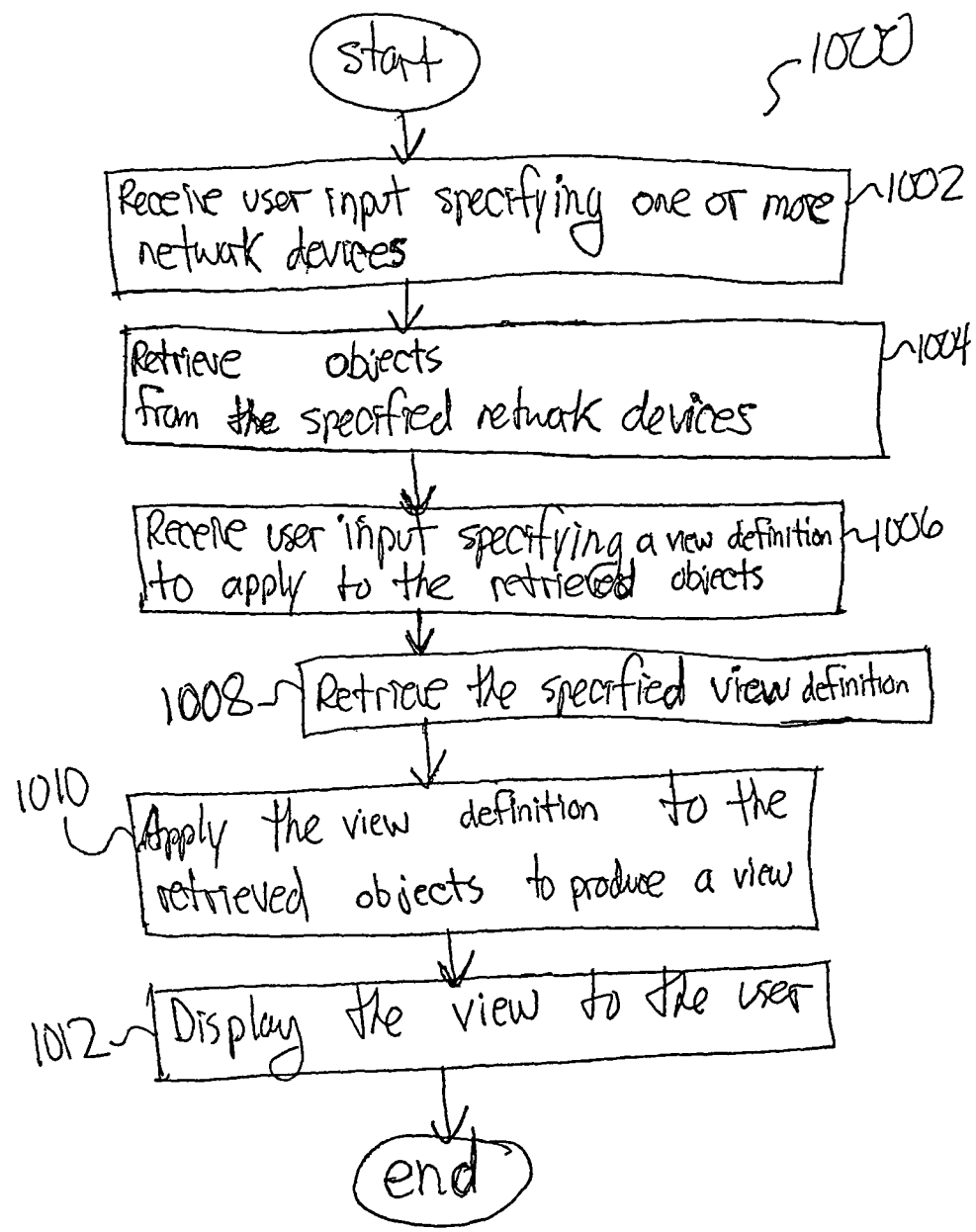
FIG. 8 is a flow chart illustrating an example of a method of providing an abstracted view of a network object database to a user.

FIG. 8 is a flow chart illustrating an example of a method 1000 of applying a view definition to one or more network devices. In Act 1002, user input specifying one or more network devices may be received. For example, a list or tree representation of the network devices of a network object database may be displayed as part of a visual user interface provided for the user, and the user may select one or more network devices from the list or tree representation.

Figure 9:
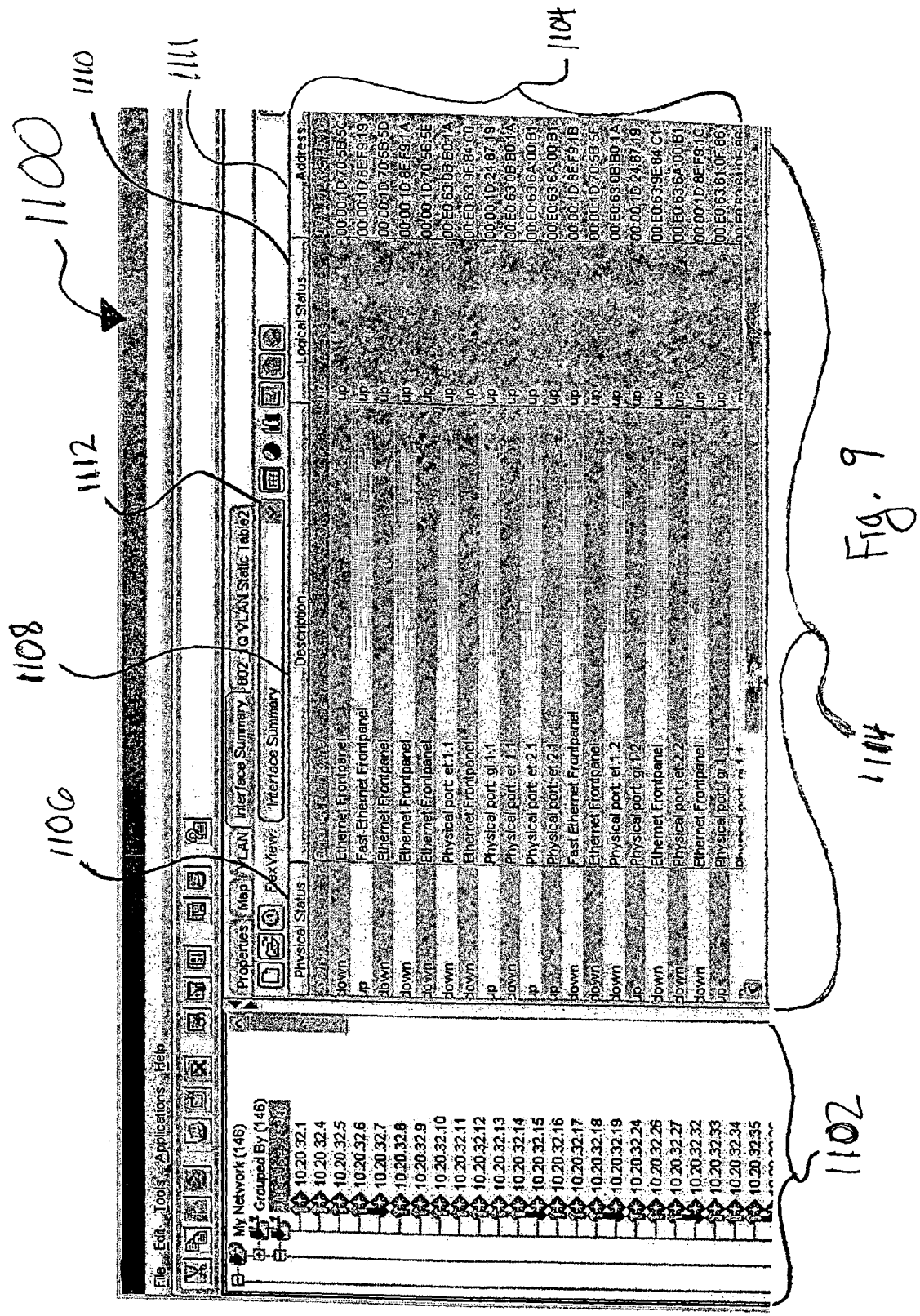
FIG. 9 is a screen shot illustrating an example of a display provided by a graphical user interface for viewing an abstracted view of a network object database.

Method 1000 may include providing a visual user interface for the user, for example, a GUI that provides GUI display 1100 of FIG. 9, although other visual user interfaces, which may provide other displays, may be used. FIG. 9 is a screen shot illustrating an example of a GUI that provides GUI display 1100 for applying a view definition to one or more network devices to produce an abstracted view of a network object database. GUI display 1100 may include network device selection panel 1102, view definition selection control 1112 and view display 1114. View display may include columns 1106, 1108, 1110 and 1111 and rows 1104. Each column corresponds to a column of the view definition and each row 1104 represents an object retrieved from a network device.

Returning to method 1000, in Act 1004, objects may be retrieved from the specified network devices. For example, objects of each object type of the network object database may be retrieved from the specified network devices. Alternatively, objects of only a subset of object-type definitions may be retrieved from the specified network devices.

In Act 1006, user input may be received specifying a view definition to apply to the retrieved objects. For example, the user may be presented with a control that provides a list of all available views, for example, combobox 1112 of GUI display 1100, from which the user may select a view.

In Act 1008, the specified view definition may be retrieved, for example, from a recording medium such as a non-volatile recording medium. Such recording medium may be located locally on a same device as the device employing method 1000, or may be located remotely on a different network device.

In Act 1010, the retrieved view definition may be applied to the retrieved objects to produce a view. For example, the view definition may be used to filter the retrieved objects to determine which objects are of the object types specified by the retrieved view definition. For example, in Act 1004, objects corresponding to twenty-five different object types may have been retrieved, but the retrieved view definition may only specify five of these objects. Accordingly, Act 1010 may include filtering out objects corresponding to the remaining twenty object types and including in the view only objects corresponding to the five object types specified by the view definition.

In an alternative embodiment of method 1000, instead of retrieving objects and then applying the view definition to filter out non-specified objects, method 1000 may include retrieving only objects of the object types specified by the view definition. In other words, method 1000 may not include Act 1004 and Act 1010 may include retrieving objects from the specified network devices.

In Act 1012, the view resulting from applying the view definition to the retrieved objects may be displayed to the user, for example, as part of a GUI display. For example, GUI display 1100 may display the view to the user in view display panel 1014.

Figure 10:
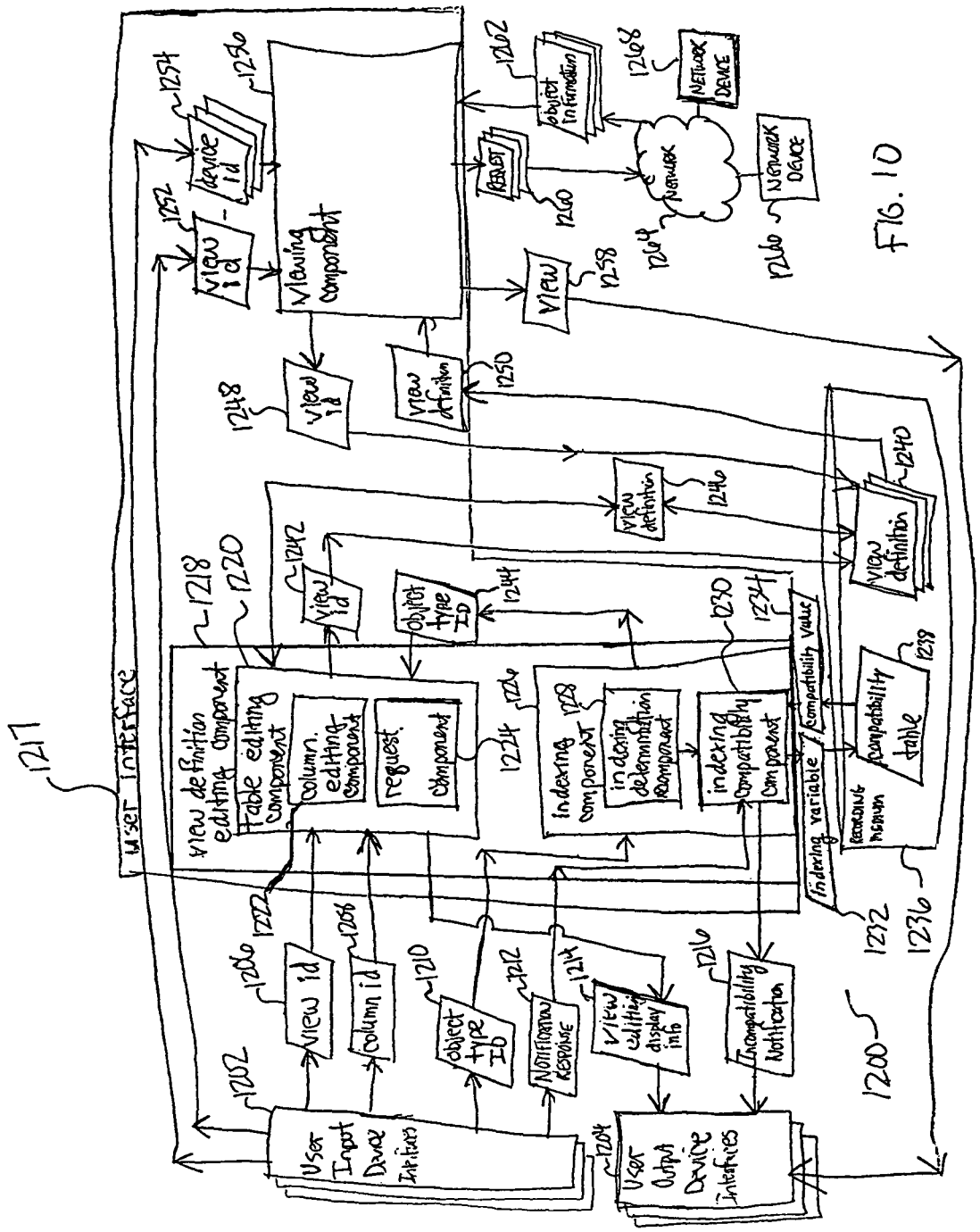
FIG. 10 is a block diagram illustrating an example of a system for editing and viewing an abstracted, dynamic and portable view of a network object database.

FIG. 10 is a block diagram illustrating an example of a system 1200 for editing an abstract view definition and applying the view definition to one or more network devices to produce a view of a network object database.

System 1200 may include any of one or more user input device interfaces 1202, one or more user output device interfaces 1204, user interface 1217 and recording medium 1236.

User interface 1217 may include view definition editing component 1218 and viewing component 1256. Alternatively, view definition editing component 1218 and viewing component 1256 may be implemented as part of separate user interfaces.

Each of the one or more user input device interfaces may be configured to interface with include any of a variety of types of user input devices, including a mouse, a track ball, a keyboard, a microphone (in combination with a voice recognition application), a touch screen, other types of devices, or any combination thereof. Each of the one or more user output device interfaces may be configured to interface with any of a variety of type of user output devices, including a computer screen, other types of display devices, speakers, other audio devices, other types of output devices, or any combination thereof.

View definition editing component 1218 may include table editing component 1220, and indexing component 1226. Table editing component 1220 may be configured to send view editing display information 1214 to one or more user output device interfaces 1204, for example, to assist in implementing GUI display 800 described above. View definition editing component 1218 further may be configured to enable a user to edit a view definition, for example, as described above in relation to methods 200 and 700 illustrated in FIGS. 2 and 7, respectively.

View definition editing component 1218 may include a table editing component 1220 and an indexing component 1226. Table editing component 1220 may include a column editing component 1222 and a request component 1224. Table editing component 1220 may be configured to receive a view ID 1206 and retrieve a view definition 1240 from recording medium 1236 using view ID 1242.

Table editing component 1220 also may configured to receive column ID 1208 from one or more user input device interfaces 1202. The column editing component 1222 may enable the user to edit the column definition specified by column ID 1208, for example, as described above. Table editing component 1220 may be configured to receive view ID 1206 and column ID 1208 to edit an already existing view.

Indexing component 1226 may be configured to receive an object type ID 1210 from the one or more user input device interfaces 1202. The indexing component 1228 then may determine whether the object type specified by the object type ID is an indexed object type or a non-indexed object type. If the object type is a non-indexed object type, then indexing component 1228 may send the object type ID 1244 to the table editing component, in response to which the table editing component may add a column to the table to represent the object type ID or modify an existing column to represent the object type ID.

If the indexing component determines that the object type is an indexed object type, then component 1228 may send the object type ID to indexing compatibility component 1230. Indexing compatibility component 1230 may determine whether the indexing variable of the object type is compatible with the indexing variable of the table, as described above in relation to method 700. The indexing compatibility component 1230 may access a compatibility table 1238 of the recording medium using the indexing variable 1232, as described above in relation to method 700. The compatibility table 1238 may return a compatibility value 1234 to the indexing compatibility component 1230. The component 1230 may repeat this process for the indexing variable being used by the table (unless the indexing compatibility component already has its value from adding the object type for which the indexing variable of the table was determined). Component 1230 then may compare the compatibility value for the indexing variable of the object type to the compatibility value of the indexing variable of the table.

If the indexing variable is compatible, then indexing compatibility component 1230 may send object type ID 1244 to the table editing component 1220 for further processing.

If the indexing compatibility component determines that the indexing variable is incompatible with that of the table, component 1230 may send an incompatibility notification 1216 to the one or more user output device interfaces to inform the user that the index variable is incompatible.

In response to notification 1216, the user may send a notification response 1212 through the one or more user input device interfaces 1202 to the indexing compatibility component 1230. If the notification response 1212 indicates that the user wishes to have a column of the table represent the object type, then the indexing compatibility component 1230 may send the object type ID 1244 to the table editing component for further processing. Else, the indexing compatibility component 1230 may return control to the table editing component to await a next object type ID or column ID.

It should be appreciated that although indexing component 1226 is illustrated as being part of user interface 1217 in FIG. 10, indexing component 1226 may be a component of system 1200 that is separate from user interface 1217.

The request component 1224 may be configured to generate request information for a column and/or an entire table, for example, in accordance with SNMP, as described above in relation to FIGS. 2-7.

The view definition editing component 1218 further may include a document generation component (not shown) configured to generate a document that includes (i.e., contains) a view definition, for example, as described above in relation to Act 210 of FIG. 2. For example, the document generation component may generate a document formatted in accordance with a markup language as XML The view editing component 1218 may be configured such that, after it has received an indication that the user is done editing the table and/or wishes to save the table, it may store (i.e., persist) the view definition 1246 on the recording medium 1236. In an embodiment, the document generation component first generates a document (e.g., an XML document) including the view definition, and then the document is stored on the recording medium 1236.

Viewing component 1256 may receive a view ID 1252 from one or more user input device interfaces 1202, in response to which component 1256 may send view ID 1248 to recording medium 1236 to retrieve view definition 1250 corresponding to view ID 1248.

In response to receiving a device ID 1254, the viewing component may send one or more requests 1260 across network 1264 to one or more network devices, for example, network devices 1266 and 1268. In response to the request 1260, the network devices may send object information 1262 to the viewing component. The viewing component then may apply the view definition 1250 to the object information 1262, for example, as described above with respect to method 700, to produce view 1258. The viewing component 1256 may be configured to send view 1258 to one or more user output device interfaces 1204 to display to the user.

System 1200, and components thereof, may be implemented using software (e.g., C, C#, C++, Java, or a combination thereof), hardware (e.g., one or more application-specific integrated circuits), firmware (e.g., electrically-programmed memory) or any combination thereof. One or more of the components of system 1200 may reside on a single system (e.g., a single network device), or one or more components may reside on separate, discrete systems (e.g., a plurality of network devices). Further, each component may be distributed across multiple systems, and one or more of the systems may be interconnected.

"Further, on each of the one or more systems that include one or more components of system 1200, each of the components may reside in one or more locations on the system. For example, different portions of the components 1202, 1204, and 1218 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components."

System 1200 may be implemented on a computer system described below in relation to FIGS. 11 and 12.

System 1200 is merely an illustrative embodiment of a system for enabling a user to edit a dynamic, abstract and/or portable view definition and/or to generate a view from such view definition. Such an illustrative embodiment is not intended to limit the scope of the invention, as any of numerous other implementations of such system, for example, variations of system 1200, are possible and are intended to fall within the scope of the invention. None of the claims set forth below are intended to be limited to any particular implementation of a system for enabling a user to edit a dynamic, abstract and/or portable view definition and/or to generate a view from such view definition unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to edit a dynamic, abstract and/or portable view definition of a network object database and/or apply such view definition to one or more network devices according to various embodiments of the invention. Further, the software design system may be located on a single computer or may be distributed among a plurality of computers attached by a communications network.

A general-purpose computer system according to one embodiment of the invention is configured to perform. It should be appreciated that the system may perform other functions, and the invention is not limited to having any particular function or set of functions.

Figure 11:
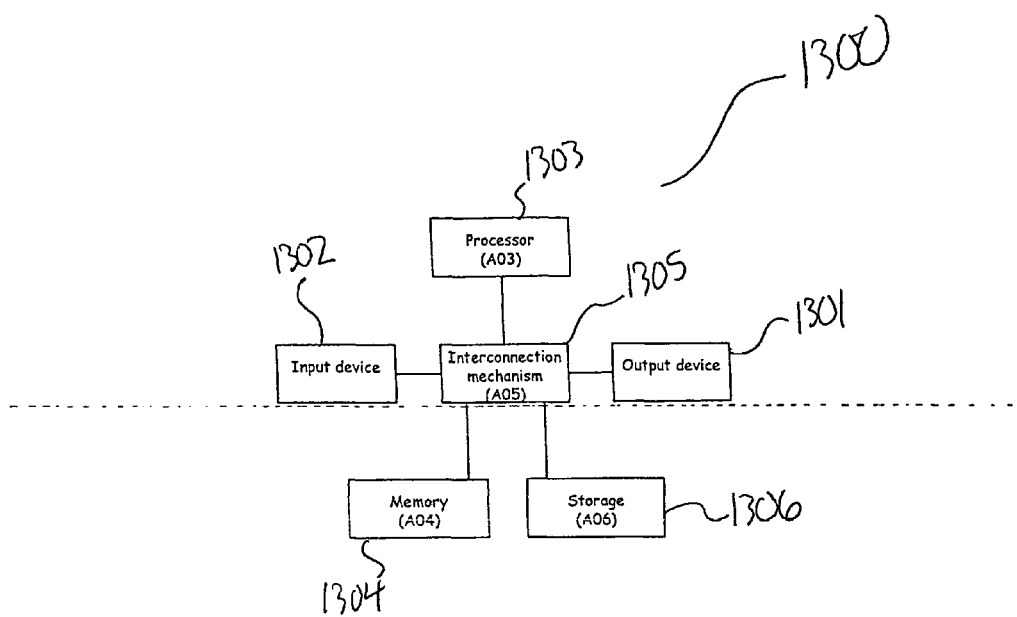
FIG. 11 is a block diagram illustrating an example of a computer system on which one or more aspects of the invention may be implemented.

For example, various aspects of the invention may be implemented as specialized software executing in a general-purpose computer system 1300 such as that shown in FIG. 11. The computer system 1300 may include a processor 1303 connected to one or more memory devices 1304, such as a disk drive, memory, or other device for storing data. Memory 1304 is typically used for storing programs and data during operation of the computer system 1300. Components of computer system 1300 may be coupled by an interconnection mechanism 1305, which may include one or more busses (e.g., between components that are integrated within a same machine) and/or a network (e.g., between components that reside on separate discrete machines). The interconnection mechanism 1305 enables communications (e.g., data, instructions) to be exchanged between system components of system 1300. Computer system 1300 also includes one or more input devices 1302, for example, a keyboard, mouse, trackball, microphone, touch screen, and one or more output devices 1301, for example, a printing device, display screen, speaker. In addition, computer system 1300 may contain one or more interfaces (not shown) that connect computer system 1300 to a communication network (in addition or as an alternative to the interconnection mechanism 1305.

Figure 12:
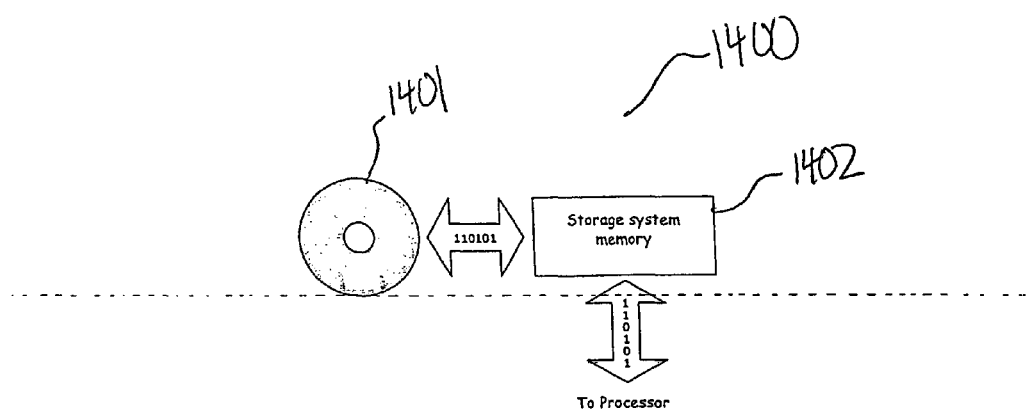
FIG. 12 is a block diagram illustrating an example of a memory system of a computer system on which one or more aspects of the invention may be implemented.

The storage system 1306, shown in greater detail in FIG. 12, typically includes a computer readable and writeable nonvolatile recording medium 1401 in which signals are stored that define a program to be executed by the processor or information stored on or in the medium 1401 to be processed by the program. The medium may, for example, be a disk or flash memory. Typically, in operation, the processor causes data to be read from the nonvolatile recording medium 1401 into another memory 1402 that allows for faster access to the information by the processor than does the medium 1401. This memory 1402 is typically a volatile, random access memory such as a dynamic random access memory (DRAM) or static memory (SRAM). It may be located in storage system 1306, as shown, or in memory system 1304, not shown. The processor 1303 generally manipulates the data within the integrated circuit memory 1304, 1402 and then copies the data to the medium 1401 after processing is completed. A variety of mechanisms are known for managing data movement between the medium 1401 and the integrated circuit memory element 1304, 1402, and the invention is not limited thereto. The invention is not limited to a particular memory system 1304 or storage system 1306.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1300 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architecture or components that that shown in FIG. 11.

Computer system 1300 may be a general-purpose computer system that is programmable using a high-level computer programming language. Computer system 1300 may be also implemented using specially programmed, special purpose hardware. In computer system 1300, processor 1303 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term).

What is claimed is:

1. A method of enabling a user to edit an operational property of two or more network objects, the method comprising:
    (A) providing a user interface comprising a viewing component for displaying a table comprising an abstracted view of a plurality of network objects representing different network devices on a communications network,
        the plurality of network objects associated with a plurality of network object types,
        the table including one or more columns,
        the user interface further comprising a view definition editing component enabling the user to specify one or more of the plurality of network object types to be included in the table;
    (B) in response to the user specifying the one or more network object types to be included in the table via the view definition editing component,
        populating at least one column of the table with operational properties of the one or more network object types, the operational properties represented by numeric or Boolean values in the table, and
        enabling the user to change operational properties of two or more of the plurality of network objects by editing a column of the table via the viewing component, the operational properties representing one or more aspects of two or more of the different types of network devices; and
    (C) in response to the user editing the column of the table via the viewing component, changing the operational properties of the two or more network objects to cause a change in the one or more aspects of the two or more different types of network devices.

2. The method of claim 1, wherein a network object database includes a first group of network object types and a second group of network object types, wherein the at least one of the network object types belongs to the first group, wherein act (A) includes the view definition editing component enabling the user to specify a second object type belonging to the second group, and the method further comprises: (D) in response to the user specifying the second object type, editing a second column of the table to represent the second object type via the view definition editing component.

3. The method of claim 2, wherein the network object database is a Management Information Base.

4. The method of claim 1, wherein act (A) includes the view definition editing component enabling the user to specify the at least one column.

5. The method of claim 1, wherein act (A) includes providing the user interface further comprising the view definition editing component to enable the user to specify a first network object type of the plurality of network object types, the method further comprising acts of:
    (D) determining whether the first network object type is an indexed network object type;
    (E) if the first network object type is an indexed network object type, determining an indexing variable for the first network object type; and
    (F) determining whether the indexing variable determined for the first network object type is compatible with an indexing variable being used for the table, wherein, act (B) includes editing at least one column via the view definition editing component based at least in part on results of act (F).

6. The method of claim 5, wherein act (F) includes determining that the indexing variable of the first network object type is not compatible with the indexing variable being used for the table, and the method further comprises: (G) preventing an editing of a column to represent the first network object type based on the results of act (F).

7. The method of claim 5, wherein the method further comprises an act of:
    (G) providing a compatibility table, the compatibility table including one or more entries, each entry corresponding to an indexing variable and storing a compatibility value mapped to the indexing variable corresponding to the entry, wherein act (F) further comprises, accessing an entry of the compatibility table corresponding to the indexing variable of the first network object type and retrieving the compatibility value stored therein, accessing an entry of the compatibility table corresponding to the indexing variable being used by the table retrieving the compatibility value stored therein, and comparing the retrieved compatibility values to determine whether the compatibility values are equal.

8. The method of claim 1, the view definition editing component further comprising: (D) for the at least one column, generating request information for retrieving objects of the at least one network object type represented by the at least one column; and (E) generating a document that includes a definition of the table and the generated request information for the at least one column.

9. The method of claim 8, the view definition editing component further comprising: (F) providing the document to one or more network devices on a network.

10. The method of claim 9, wherein act (F) comprises providing the document to at least one of the network devices using electronic mail.

11. The method of claim 8, wherein act (D) includes configuring the request information in accordance with Simple Network Management Protocol.

12. The method of claim 8, wherein act (E) includes formatting the document in accordance with a markup language.

13. The method of claim 12, wherein act (E) includes formatting the document in accordance with Extensible Markup Language (XML).

14. A computer-readable medium having computer-readable instructions stored thereon that, as a result of being executed by a computer, instruct the computer to perform a method of enabling a user to edit an operational property of two or more network objects, the method comprising acts of:
    (A) providing a user interface comprising a viewing component for displaying a table comprising an abstracted view of a plurality of network objects representing different network devices on a communications network,
        the plurality of network objects associated with a plurality of network object types,
        the table including one or more columns,
        the user interface further comprising a view definition editing component enabling the user to specify one or more of the plurality of network object types to be included in the table;
    (B) in response to the user specifying the one or more network object types to be included in the table via the view definition editing component,
        populating at least one column of the table with operational properties of the one or more network object types, the operational properties represented by numeric or Boolean values in the table, and
        enabling the user to set operational properties of two or more of the plurality of network objects by editing a column of the table via the viewing component, the operational properties representing one or more aspects of two or more of the different types of network devices; and (C) in response to the user editing the column of the table via the viewing component, changing the operational properties of the two or more network objects to cause a change in the one or more aspects of the two or more different types of network devices.

15. A system for enabling a user to edit an operational property of two or more network objects, the system comprising a storage media coupled to a processor executing:
 a viewing component for displaying a table comprising an abstracted view of a plurality of network objects representing different network devices on a communications network, the plurality of network objects associated with a plurality of network object types, the table including one or more columns;
 a view definition editing component to:
  enable the user to specify one or more of the plurality of network object types to be included in the table;
  in response to the user specifying the one or more network object types to be included in the table, populate at least one column of the table with operational properties of the one or more network object types, the operational properties represented by numeric or Boolean values in the table, and
 the viewing component to:
  enable the user to change operational properties of two or more of the plurality of network objects by editing a column of the table, the operational properties representing one or more aspects of two or more of the different types of network devices; and
  in response to the user editing the column of the table, change the operational properties of the two or more network objects to cause a change in an operational characteristic of the one or more aspects of the two or more different types of network devices.

16. The system of claim 15, wherein a network object database includes a first group of network object types and a second group of network object types, the at least one of the network object types belonging to the first group, wherein the view definition editing component is further operable to enable the user to specify a second object type belonging to the second group, and, in response to the user specifying the second object type, to edit a second column of the table to represent the second object type.

17. The system of claim 16, wherein the network object database is a Management Information Base.

18. The system of claim 15, wherein the view definition editing component is further operable to enable the user to specify the at least one column.

19. The system of claim 15, wherein the view definition editing component is further operable to enable the user to specify a first of the plurality of network object types, wherein the system further comprises an indexing component to determine whether the first network object type is an indexed network object type, to determine, in the event that the first network object type is an indexed network object type, an indexing variable for the first network object type, and to determine whether the indexing variable of the first network object type is compatible with an indexing variable being used by the table, and wherein the view definition editing component is further operable to edit the at least one column based at least in part on the determination of whether the indexing variable of the first network object type is compatible with the indexing variable used for the table.

20. The system of claim 19, wherein the indexing component is further operable to determine that the indexing variable of the first network object type is not compatible with the indexing variable being used by the table, and to prevent an editing of a column to represent the first network object type based on the determination of incompatibility.

21. The system of claim 19, further comprising: a compatibility table, the compatibility table including one or more entries, each entry corresponding to an indexing variable and storing a compatibility value mapped to the indexing variable corresponding to the entry, wherein the indexing component is further operative to access an entry of the compatibility table corresponding to the indexing variable of the first network object type and retrieve the compatibility value stored therein, to access an entry of the compatibility table corresponding to the indexing variable being used by the table and retrieve the compatibility value stored therein, and to compare two retrieved compatibility values to determine whether the compatibility values are equal.

22. The system of claim 15, the view definition editing component further comprising: a request component to generate request information for retrieving objects of the at least one network object type; and a document generation component to generate a document that includes a definition of the table and the request information.

23. The system of claim 22, wherein the document generation component is operable to configure the document to be transmittable to one or more network devices on a network.

24. The system of claim 23, wherein the document generation component is operable to configure the document to be transmittable to at least one of the network devices using electronic mail.

25. The system of claim 22, wherein the request component is operable to configure the request in accordance with Simple Network Management Protocol.

26. The system of claim 22, wherein the document generation component is operable to format the document in accordance with a markup language.

27. The system of claim 26, the document generation component is operable to format the document in accordance with Extensible Markup Language (XML).

28. The system of claim 15, wherein the system further comprises a graphical user interface to enable the user to select from among the plurality of network object types.

29. A system for enabling a user to edit an operational property of two or more network objects, the system comprising a storage media coupled to a processor executing:
 a viewing component
  for displaying a table comprising an abstracted view of a plurality of network objects representing different network devices on a communications network, the plurality of network objects associated with a plurality of network object types;
  for displaying one or more columns including operational properties of the one or more network object types, the operational properties represented by numeric or Boolean values in the table;
 a view definition editing component
  for enabling the user to specify one or more of the plurality of network object types to be included in the table, and
 the viewing component for editing at least one column of the table to change the operational properties of two or more of the plurality of network objects that represent one or more aspects of two or more different types of network devices on the communications network, the change in the operational property causing a change in the one or more aspects of the two or more different types of network devices.

30. A method of editing a portable abstract view definition of a network object database including a plurality of network objects, the method comprising acts of:
  (A) editing a column of a table comprising an abstract view of the network object database, the editing changing operational properties of two or more of the plurality of network objects representing one or more aspects of two or more different types of network devices on a communications network, the change in the operational property causing a change in the one or more aspects of the two or more different types of network devices; and
  defining the abstract view by:
    (B) generating request information for retrieving the two or more network objects representing the one or more aspects of the two or more different types of network devices; and
    (C) generating a document that includes a definition of the table, the table definition including the generated request information and a definition of the column of the table.

31. The method of claim 30, defining the abstract view further comprising:
  (D) providing a user interface to the user to enable the user to specify the one network object type.

32. The method of claim 30, defining the abstract view further comprising:
  (D) storing the document on a computer-readable medium.

33. The method of claim 30, defining the abstract view further comprising:
  (D) providing the document to one or more network devices on a network.

34. The method of claim 33, wherein act (D) comprises providing the document to at least one of the network devices using electronic mail.

35. The method of claim 30, wherein the network object database is a Management Information Base.

36. The method of claim 35, wherein act (B) includes configuring the request information in accordance with Simple Network Management Protocol.

37. The method of claim 30, wherein act (B) includes configuring the request information in accordance with Simple Network Management Protocol.

38. The method of claim 30, wherein act (C) includes formatting the document in accordance with a markup language.

39. The method of claim 38, wherein act (C) includes formatting the document in accordance with Extensible Markup Language (XML).

40. A computer-readable medium having computer-readable instructions stored thereon that, as a result of being executed by a computer, instruct the computer to perform a method of editing a portable abstract view definition of a network object database including a plurality of network objects representing different network devices on a communications network, the method comprising acts of:
  (A) editing a column of a table comprising an abstract view of the network object database, the editing changing operational properties of two or more of the plurality of network objects that represent one or more aspects of two or more of the different types of network devices on the communications network, the change in the operational property causing a change in the one or more aspects of the two or more different types of network devices; and
  defining the abstract view by:
    (B) generating request information for retrieving the two or more network objects representing the one or more aspects of the two or more different types of network devices; and
    (C) generating a document that includes a definition of the table, the table definition including the generated request information and a definition of the column of the table.

41. A system for editing a portable abstract view definition of a network object database including a plurality of network objects representing different network devices on a communications network, the system comprising:
  a viewing component to edit a column of a table comprising an abstract view of the network object database, the editing changing operational properties of two or more of the plurality of network objects representing one or more aspects of two or more of the different types of network devices on the communications network, the change in the operational property causing a change in the one or more aspects of the two or more different types of network devices; and
  a view definition editing component comprising:
    a request component to generate request information for retrieving the two or more network objects representing the one or more aspects of the two or more different types of network devices; and
    a document generation component to generate a document that includes a definition of the table, the definition of the table including the generated request information and a definition of the column of the table.

* * * * *